United States Patent
Kobayashi et al.

(10) Patent No.: US 7,334,568 B2
(45) Date of Patent: Feb. 26, 2008

(54) KNOCK CONTROL APPARATUS FOR AN INTERNAL COMBUSTION ENGINE AND CONTROL METHOD THEREOF

(75) Inventors: Daisuke Kobayashi, Toyota (JP); Satoshi Masuda, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/522,912

(22) Filed: Sep. 19, 2006

(65) Prior Publication Data

US 2007/0062488 A1    Mar. 22, 2007

(30) Foreign Application Priority Data

Sep. 20, 2005  (JP) ............................. 2005-271829

(51) Int. Cl.
*F02P 5/152* (2006.01)
*F02D 45/00* (2006.01)

(52) U.S. Cl. ................. 123/406.38; 73/35.03; 123/435

(58) Field of Classification Search .......... 123/406.37, 123/406.38, 406.39, 435; 73/35.01, 35.03, 73/35.04, 35.05, 35.06, 35.11
See application file for complete search history.

(56) References Cited

U.S. PATENT DOCUMENTS 5,373,448 A * 12/1994 Katogi et al. ............... 123/435
5,996,398 A * 12/1999 Schleupen et al. ......... 73/35.05

FOREIGN PATENT DOCUMENTS

| JP | A 5-26721 | 2/1993 |
| JP | A 7-109949 | 4/1995 |
| JP | A 8-177697 | 7/1996 |
| JP | A 2002-30985 | 1/2002 |
| JP | A 2002-47994 | 2/2002 |
| JP | B2-3335628 | 8/2002 |
| WO | WO 93/15384 | 5/1993 |

* cited by examiner

*Primary Examiner*—T. M Argenbright
(74) *Attorney, Agent, or Firm*—Oliff & Berridge, PLC

(57) ABSTRACT

In addition to a knock detection filter, a plurality of optimal knock frequency detection filters (digital filters: BPFs) are provided which filter the signals output from a knock sensor and has mutually different filtering frequency bands. A presently optimal frequency is selected based on the signals extracted by the optimal frequency detection filters, and set as the center frequency of the filtering frequency band of the knock detection filter.

14 Claims, 6 Drawing Sheets

KNOCK CONTROL APPARATUS FOR AN INTERNAL COMBUSTION ENGINE AND CONTROL METHOD THEREOF

INCORPORATION BY REFERENCE

The disclosure of Japanese Patent Application No. 2005-271829 filed on Sep. 20, 2005 including the specification, drawings and abstract is incorporated herein by reference in its entirety.

BACKGROUND OF THE INVENTION

1. Field of the Invention

The invention relates to a knock control apparatus for an internal combustion engine that controls an operating state of the internal combustion engine based on the knock determination result, and a control method thereof.

2. Description of the Related Art

In an internal combustion engine (hereinafter also referred to as "engine") of a vehicle or the like, ignition timings largely effect, for example, exhaust gas, fuel consumption, drivability (i.e., output torque of the engine), and so on. Therefore, ignition timings are controlled so as to be optimal for the operating state of the engine. When controlling ignition timings, an ECU (Electronic Control Unit), for example, calculates the optimal ignition timings based on the operating state of the engine (e.g. speed and load of the engine), and activates ignition plugs at the calculated ignition timings.

Further, in an engine of a vehicle, a KCS (Knock Control System) control that suppresses or prevents knocks of the engine is performed. In the KCS control, a filter for determining knocks (e.g. a band-pass filter) extracts the signals that fall in a knock frequency band (e.g. a frequency band with a center frequency of 7 kHz, 11 kHz, or 14 kHz) from among the signals output from the knock sensor provided in the cylinder block of the engine or other. Whether knocks are occurring is determined by comparing the peak value of the extracted knock sensor signals and a predetermined knock determination level. If it is determined that knocks are occurring, the ignition timings, in order to suppress or prevent the knocks, are retarded from the standard ignition timings so that the combustion speed of air-fuel mixture decreases and thus the maximum combustion pressure. If it is determined that knocks are not occurring, the ignition timing control is performed so that the ignition timing is gradually advanced to optimize the ignition timing.

The center frequency of the filtering frequency band of a knock detection filter used in KCS control as described above is set so as to match the actual frequency of knocks of an engine (hereinafter will be referred to as "knock frequency"). However, as the knock frequency changes due to age deterioration of the engine or the like, as shown in FIG. 6, a difference arises between the center frequency of the knock determination filter that has been initially set and the knock frequency, which reduces the accuracy in detecting knocks. As the technology for addressing this problem, a knock control apparatus is disclosed in Japanese Patent Publication Application No. JP-A-8-177697.

In the knock control disclosed in Japanese Patent Publication Application No. JP-A-8-177697, when knocks are actually detected, a difference between the frequency at which the knock sensor actually resonates and the set value of the resonant frequency of the knock sensor that is previously set and stored is detected. When the actual and set resonant frequencies are different, the set (stored) resonant frequency is corrected so as to eliminate the difference, and therefore good knock controllability is obtained.

In the knock control disclosed in Japanese Patent Publication Application No. JP-A-8-177697, when a deviation σ (or a peak value V) in the knock strength distribution of one of cylinders of the engine is smaller than a predetermined threshold, and the deviations σ (or peak values V) in the knock strength distributions of other cylinders are larger than the predetermine threshold, it is determined that the resonant frequency has deviated from the optimal frequency. Then, the filter characteristics of a resonant frequency switching circuit are switched, so that the center frequency is shifted to the optimal frequency. As such, in this control, the detecting and setting processes for obtaining the optimal frequency become very complicated. Further, since the threshold applied to the deviation of the resonant frequency from the optimal frequency depends on the engine speed and cylinder positions, there is a problem that matching of the threshold is difficult.

SUMMARY OF THE INVENTION

The invention provides a knock control apparatus for an internal combustion engine which changes the center frequency of the filtering frequency band of a filter for detecting knocks of the internal combustion engine in a simple manner and which therefore can maintain desired accuracy in detecting knocks even when the knock frequency of the internal combustion engine changes due to its age deterioration or other, and a method for controlling the same apparatus.

A first aspect of the invention relates to a knock control apparatus for an internal combustion engine, including: a knock sensor that detects a vibration of the internal combustion engine; a knock detection filter that extracts signals that fall in a filtering frequency band from among signals output from the knock sensor; a knock determination device that determines whether knocks are occurring based on the signals extracted by the knock detection filter, a result of the determination being used to control an operating state of the internal combustion engine; a plurality of optimal knock frequency detection filters used to filter signals output from the knock sensor and having mutually different filtering frequency bands; and an optimal knock frequency setting device that sets a center frequency of the filtering frequency band of the knock detection filter to an optimal knock frequency that is determined based on the signals extracted by the optimal knock frequency detection filters.

According to the first aspect of the invention, the optimal knock frequency detection filters to which mutually different filtering frequency bands are set are employed, and a presently optimal knock frequency is selected. Then, the center frequency of the filtering frequency band of the knock detection filter is set to the optimal knock frequency. Therefore, when the knock frequency of the internal combustion engine changes due to its age deterioration or other, the center frequency of the filtering frequency band of the knock detection filter can be accordingly changed. As a result, desired accuracy in detecting knocks is maintained.

In addition, the optimal knock frequency detection filters are separately provided from the knock detection filter, and the optimal knock frequency is selected by parallel processing. Then, the center frequency of the filtering frequency band of the knock detection filter is set to the optimal knock frequency. Therefore, it is not necessary any longer to perform the conventional processes, like the foregoing complicated process in which a deviation σ in the knock strength distribution is calculated for each cylinder to detect the deviation of the resonant frequency from an optimal frequency. Accordingly, it is possible to set the optimal knock frequency to the knock detection filter in a simple manner.

In the first aspect of the invention, as an example of detailed structure for selecting an optimal knock frequency, the optimal frequency setting apparatus may select, as an optimal knock frequency, a center frequency of a filtering frequency band of one of the optimal knock frequency detection filters that has detected a largest number of knocks for a predetermined period of time (i.e., the optimal knock frequency detection filter that has produced a signal having the highest peak value), and to set the center frequency of the filtering frequency band of the knock detection filter to the optimal knock frequency.

In the first aspect of the invention, as an example of detailed structure for setting the center frequency of the filtering frequency band of the knock detection filter to the optimal knock frequency, a comparison may be made between a center frequency of the filtering frequency band that has been set to the knock detection filter and a presently optimal knock frequency determined based on the signals extracted by the optimal knock frequency detection filters, and if the present center frequency is different from the presently optimal knock frequency, the center frequency of the filtering frequency band of the knock detection filter may be switched to the presently optimal knock frequency. If there is no deviation between the present center frequency of the knock detection filter and the presently optimal knock frequency, switching of the center frequency of the knock detection filter is not performed, that is, the present center frequency of the knock detection filter is maintained.

A second aspect of the invention relates to a knock control method for an internal combustion engine including a knock sensor that detects a vibration of the internal combustion engine, a knock detection filter that extracts signals that fall in a filtering frequency band from among signals output from the knock sensor, and a knock determination device that determines whether knocks are occurring based on the signals extracted by the knock detection filter. This method includes the steps of: setting a center frequency of the filtering frequency band of the knock detection filter to an optimal knock frequency that is determined based on signals extracted by a plurality of optimal knock frequency detection filters used to filter signals output from the knock sensor and having mutually different filtering frequency bands; and controlling an operating state of the internal combustion engine based on a determination result of the knock determination device.

According to the second aspect of the invention, a presently optimal knock frequency is selected using the optimal frequency detection filters that are separately provided from the knock detection filter, and the center frequency of the filtering frequency band of the knock detection filter is set to the selected optimal knock frequency. As such, desired accuracy in detecting knocks can be achieved in simple manners.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a view showing the problem caused when the knock frequency changes due to age deterioration of the engine and the like.

DETAILED DESCRIPTION OF THE PREFERRED EMBODIMENTS

An embodiment of the invention will be described below with reference to the attached drawings.

[Engine]

Figure 2:
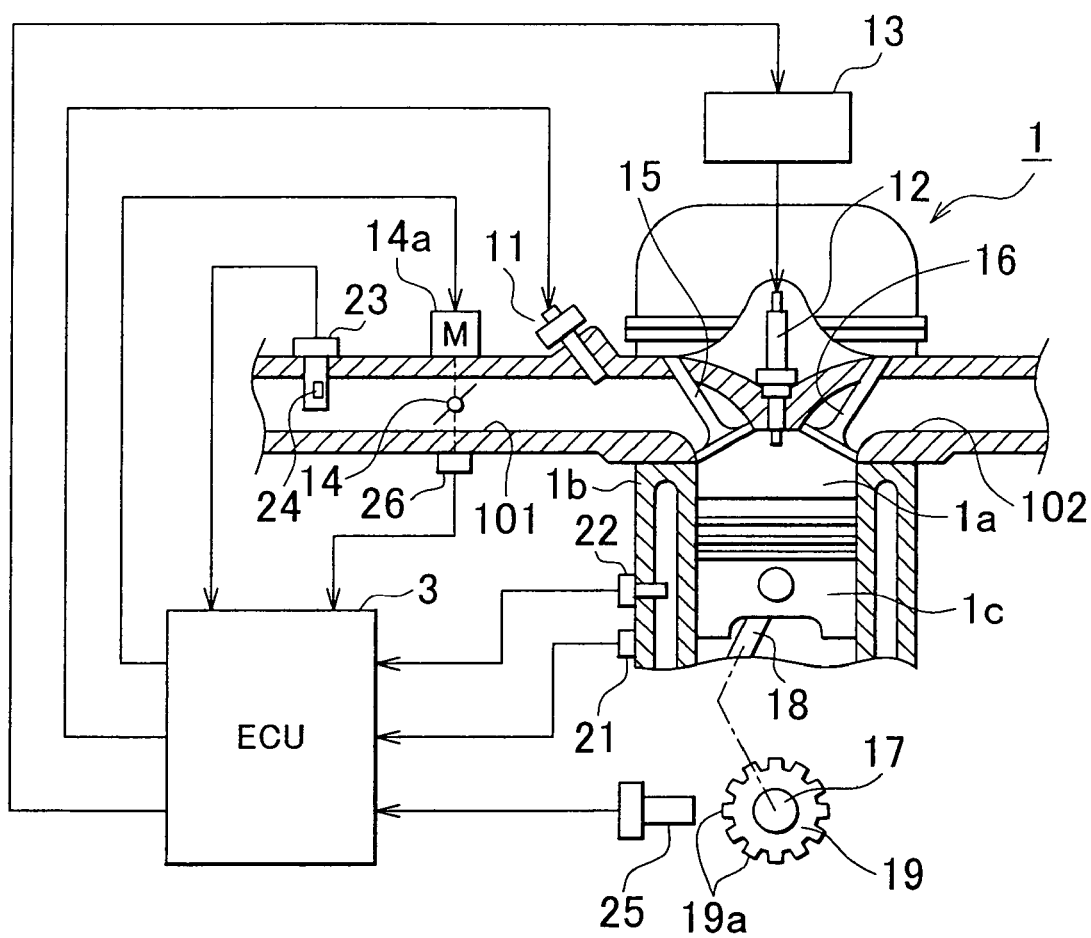
FIG. 2 is a view schematically showing an example of the engine to which the invention is applied.

An engine to which the invention is applied will first be described with reference to FIG. 2. FIG. 2 shows the structure of only one cylinder of the engine.

An engine 1 is a multi-cylinder gasoline engine and includes a piston 1c that defines a combustion chamber 1a. The engine 1 also includes a crankshaft 17 as an output shaft. The piston 1c is connected to the crankshaft 17 through a connecting rod 18. Reciprocating motion of the piston 1c is converted to rotary motion of the crankshaft 17 through the connecting rod 18.

A signal rotor 19 including a plurality of protrusions (teeth) 19a on its outer periphery is attached on the crankshaft 17. A crank position sensor 25 is arranged in proximity to the signal rotor 19 at one side thereof. The crank position sensor 25 is, for example, an electromagnetic pickup. The electromagnetic pickup generates a pulse signal (output pulse) that corresponds to each of the protrusions 19a of the signal rotor 19 when the crankshaft 17 rotates.

The combustion chamber 1a of the engine 1 is provided with an ignition plug 12. The ignition timing of the ignition plug 12 is adjusted by an igniter 13, and the igniter 13 is controlled by an ECU 3, as will be described later.

A cylinder block 1b of the engine 1 includes a water temperature sensor 22 that detects water temperature of the engine (coolant temperature) and a knock sensor 21. The knock sensor 21 detects vibration of the engine that is transmitted to the cylinder block 1b of the engine 1. The knock sensor 21 employed in the embodiment is a flat sensor (a nonresonant type knock sensor) and has substantially flat output characteristics over a wide band of the frequency of the engine vibration.

An intake passage 101 and an exhaust passage 102 are connected to the combustion chamber 1a of the engine 1. An intake valve 15 is provided between the intake passage 101 and the combustion chamber 1a. The intake passage 101 and the combustion chamber 1a are placed in communication by opening the intake valve 15, and the communication is interrupted by closing the intake valve 15. Further, an exhaust valve 16 is provided between the exhaust passage 102 and the combustion chamber 1a. The exhaust passage 102 and the combustion chamber 1a are placed in communication by opening the exhaust valve 16, and the communication is interrupted by closing the exhaust valve 16. The intake valve 15 and the exhaust valve 16 are opened and closed by rotation of an intake camshaft and an exhaust camshaft, respectively, to each of which the rotation of the crankshaft 17 is transmitted.

A heat wire air flow meter 23, an intake air temperature sensor 24 (built in the air flow meter 23), and an electronically controlled throttle valve 14 for adjusting the amount of intake air of the engine 1 are provided in the intake air passage 101. The throttle valve 14 is driven by a throttle motor 14a, and the degree of opening of the throttle valve 14 is detected by a throttle position sensor 26. An $O_2$ sensor that detects concentration of oxygen contained in exhaust gas, a three-way catalyst, and the like are provided in the exhaust passage 102 of the engine 1.

An injector (fuel injection valve) 11 for injecting fuel is provided in the intake passage 101. Fuel at a predetermined pressure is supplied from a fuel tank to the injector 11 using a fuel pump and is injected from the injector 11 into the intake passage 101. The injected fuel is mixed with intake air to form air-fuel mixture, and the air-fuel mixture is introduced to the combustion chamber 1a of the engine 1. The air-fuel mixture introduced into the combustion chamber 1a is ignited by the ignition plug 12 for combustion. The combustion of the air-fuel mixture in the combustion chamber 1a causes the piston 1c to reciprocate to rotate the crankshaft 17. The operational state of the engine 1 is controlled by the ECU 3.

[ECU]

Figure 1:
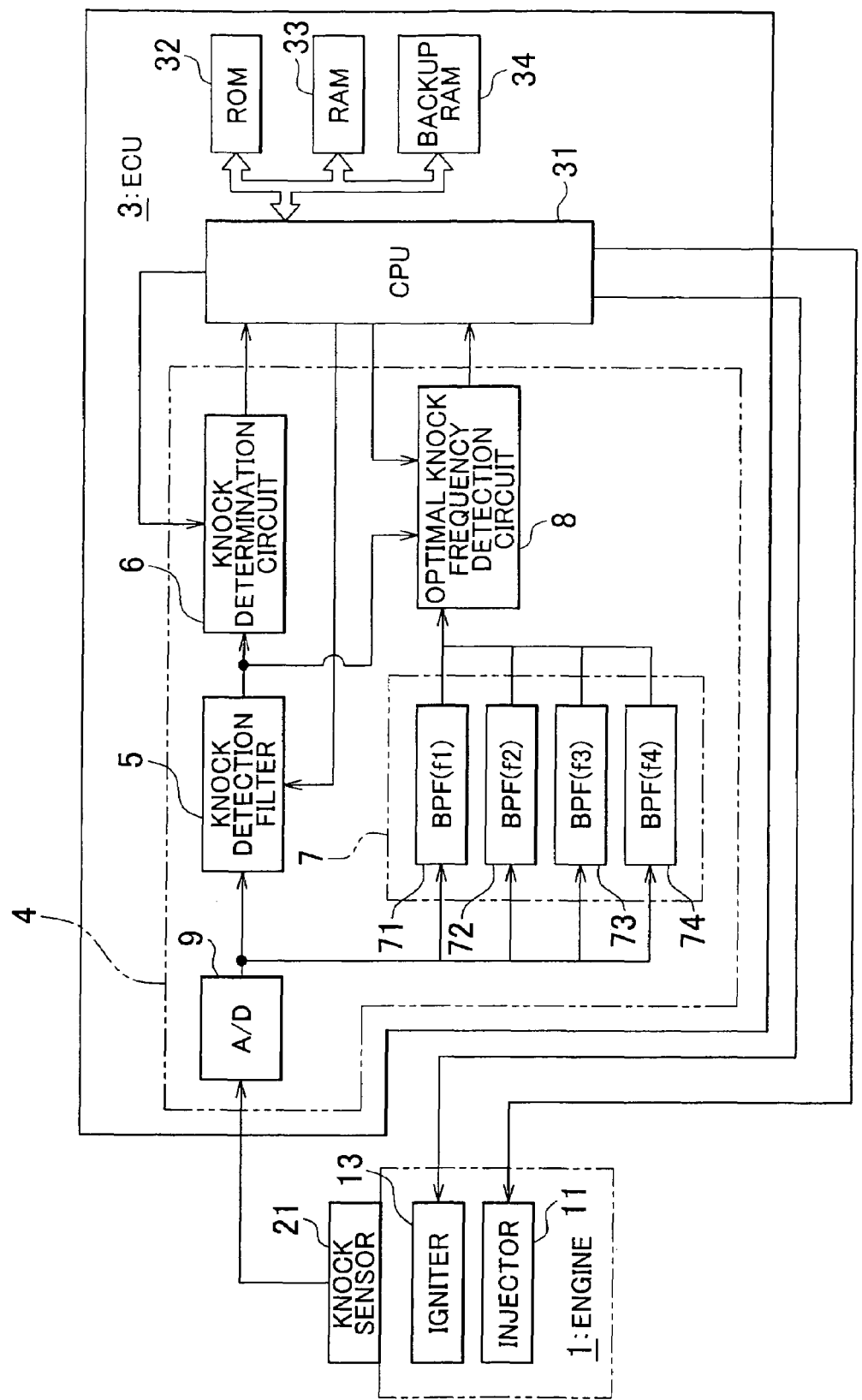
FIG. 1 is a view schematically showing the embodiment of the invention.

As shown in FIG. 1, the ECU 3 includes a CPU 31, a ROM 32, a RAM 33, a backup RAM 34, a knock determination processing portion 4, and the like. Various control programs and maps that are used when the control programs are executed are stored in the ROM 32. The CPU 31 executes calculation processes based on the control programs and the maps stored in the ROM 32. The RAM 33 is a memory that temporarily stores calculation results of the CPU 31, data input from the sensors, and the like. The backup RAM 34 is a non-volatile memory that stores, for example, data which needs to be stored when the engine 1 is to be stopped.

The knock determination processing portion 4 includes an A/D converter 9, a knock detection filter 5, a knock determination circuit 6, a detection filter portion 7 for determining optimal knock frequency, an optimal knock frequency detection circuit 8, and the like. The A/D converter 9 performs A/D conversion of the signals output from the knock sensor 21 that is provided on the cylinder block 1b of the engine 1.

The knock detection filter 5 is a digital filter that extracts the signals that fall in a frequency band specific to engine knocks from among the signals output from the knock sensor 21 (i.e., the A/D converted signals). In this example, a band-pass filter (BPF) is used. A center frequency f0 of the knock detection filter 5 is variable, and is set in accordance with a switch command from the CPU 31. A value corresponding to the knock frequency of the engine 1 (e.g., 7 kHz, 11 kHz, or 14 kHz) is set as an initial center frequency f0 of the filtering frequency band of the knock detection filter 5.

Figure 4:
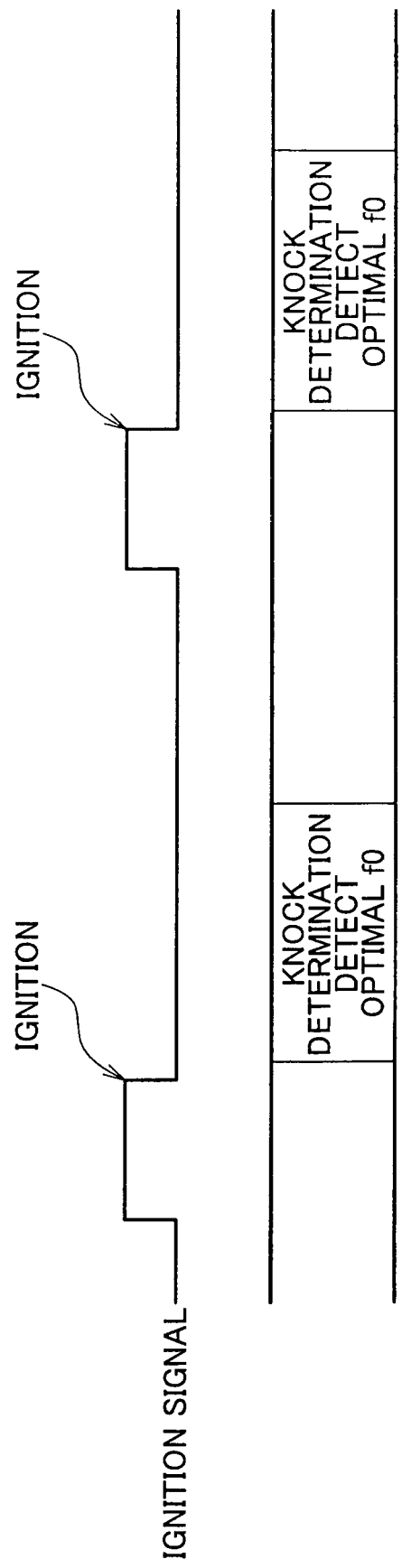
FIG. 4 is a time chart showing the knock determination periods (optimal f0 detection periods)

The knock detection circuit 6 detects the peak value of the signals that have been extracted by the knock detection filter 5 during the period identified by the determination command from the CPU 31 (i.e., "knock determination period" shown in FIG. 4). The knock detection circuit 6 then determines whether knocks are occurring by comparing the peak value with a predetermined knock determination level. The determination result is input to the CPU 31.

The detection filter portion 7 is constituted by band-pass filters (BPFs) 71, 72, 73, and 74 that are connected in parallel to each other. The center frequencies f1, f2, f3, f4 of the filtering frequency bands of the BPF 71 to 74 are set to the values different from each other. The center frequencies f1, f2 of the filtering frequency bands of the BPF 71, 72 are set lower than the initial center frequency f0 that is initially set to the knock detection filter 5. The center frequencies f3, f4 of the filtering frequency bands of the BPF 73, 74 are set higher than the initial center frequency f0. More specifically, these center frequencies are set such that: f1<f2<f0 (initial center frequency)<f3<f4. For example, the center frequencies f1, f2, f3, f4 are made lower or higher than the initial center frequency f0 (e.g., 7 kHz, 11 kHz, or 14 kHz) by an order of magnitude, from 0.1 kHz to 0.3 kHz, respectively.

The signals output from the knock sensor 21 (i.e., the A/D converted signals) are simultaneously input to each of the BPF 71 to 74 of the detection filter portion 7. The signals extracted by the BPF 71 to 74, that is, the four signal groups extracted through the filtering frequency bands with the centered frequencies f1 to f4, respectively, are input to the optimal knock frequency detection circuit 8. The signals extracted by the knock detection filter 5, that is, the signals extracted through the filtering frequency band with the center frequency f0, are also input to the optimal knock frequency detection circuit 8.

Figure 3:
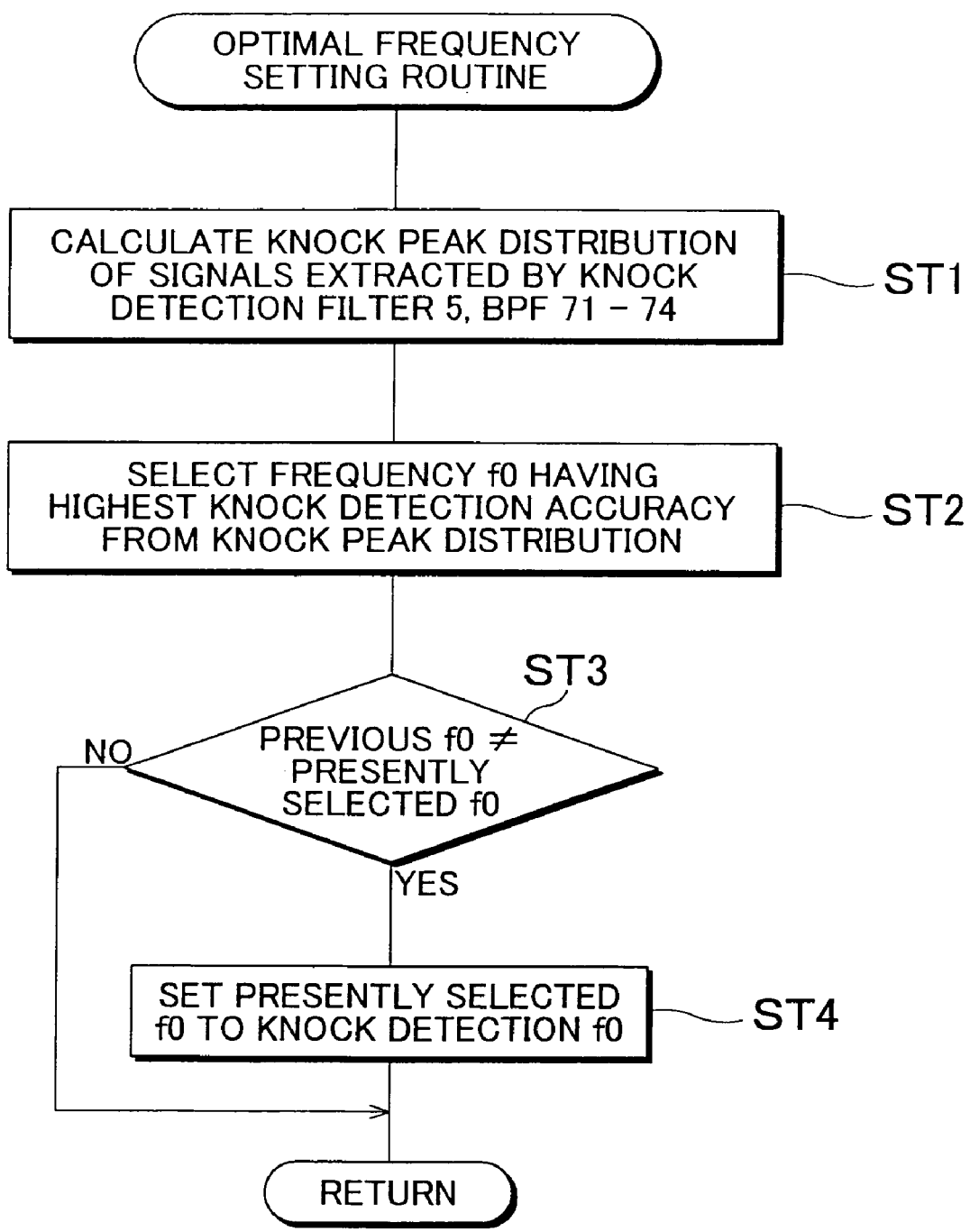
FIG. 3 is a flowchart showing an example of the optimal frequency setting process that is executed by the ECU.

The optimal knock frequency detection circuit 8 reads in the signals that have been extracted by the BPF 71 to 74 of the detection filter portion 7 and the knock detection filter 5 during the period identified by the command output from the CPU 31 for determining an optimal knock frequency, i.e., during the optimal f0 detection period (knock determination period) shown in FIG. 4. Then, the optimal knock frequency detection circuit 8 obtains the distribution of knock peaks derived from these signals (i.e., the signals extracted through the filtering frequency bands with the center frequencies f1 to f4, and f0), and selects an optimal knock frequency (filter frequency) based on the knock peak distribution. The selection result is input to the CPU 31. These processes performed by the optimal knock frequency detection circuit 8 correspond to steps ST1, ST2 in the flowchart shown in FIG. 3, which will be described later. The method for selecting an optimal knock frequency will also be described later.

The ECU 3 executes controls, such as an ignition timing control (including one to retard ignition timings), of the engine 1 by controlling the injector 11, the igniter 13 of the ignition plug 12, the throttle motor 14a of the throttle valve 14, and so on, based on the signals output from the water temperature sensor 22, the air flow meter 23, the intake air temperature sensor 24, the $O_2$ sensor, the crank position sensor 25, the throttle position sensor 26, and so on. Further, the ECU 3 executes a knock control and an optimal knock frequency setting process, which will be described later, based on the signals output from the knock sensor 21.

[Knock Control]

During the knock determination period shown in FIG. 4, the ECU 3 reads in the signals extracted by the knock detection filter 5 and determines whether knocks are occurring by comparing the peak value of the extracted signals with the predetermined knock determination level. If the determination result indicates that knocks are occurring, the ECU 3 delays the ignition timing so as to suppress or prevent the knocks. If the determination result indicates that knocks are not occurring, the ECU 3 gradually advances the ignition timing so as to increase the engine output. It should be noted that the engine 1 knocks during the combustion stroke only. In view of this, in this example, the ECU 3 executes the knock determination processes only in the knock determination period shown in FIG. 4 in order to prevent false detection caused by noise.

[Optimal Knock Frequency Setting Process]

An example of the optimal knock frequency setting process executed by the ECU 3 will be described with reference to FIG. 1, FIG. 3, FIG. 4, FIG. 5A, and FIG. 5B.

This optimal knock frequency setting process routine is executed at every predetermined crank angle (every ignition for each cylinder).

First, the ECU 3 reads in the signals that have been extracted by the BPF 71 to 74 of the detection filter portion 7 and the knock detection filter 5 (i.e., the signals extracted through the filtering frequency bands with the center frequencies f1 to f4, and f0) in each optimal f0 determination period (i.e., knock determination period) shown in FIG. 4. Then, the ECU 3 obtains the distribution of knock peaks derived from these extracted signals (step ST1).

In step ST2, the ECU 3 selects the frequency with the highest accuracy in detecting knocks by referring to the knock peak distribution of the extracted signals (i.e., the signals extracted through the filtering frequency bands with the center frequencies f1 to f4, and f0) obtained in step ST1. More specifically, the ECU 3 compares the peak values in the knock peak distribution, and selects the center frequency of the filtering frequency band of the filter that provides the highest peak value (the BPF 71, 72, 73, 74 or the knock detection filter 5) as an optimal peak frequency f0.

Regarding the selection of the optimal peak frequency described above, when there is no deviation of the knock frequency of the engine 1, which is caused by age deterioration of the engine 1 or other, that is, when the knock frequency of the engine 1 matches the initial center frequency f0 that is initially set to the knock detection filter 5, the peak value of the signals extracted by the knock detection filter 5 becomes the largest. Therefore, the initial center frequency that has been set to the knock detection filter 5 is selected as the optimal peak frequency f0.

On the other hand, when the knock frequency does not match the center frequency f0 of the knock detection filter 5 due to age deterioration of the engine 1 or other, the peak value of the signals extracted by any one of the BPF 71 to 74 of the detection filter portion 7 becomes the largest. For example, when the peak value of the signals extracted by the BPF 72 is the largest among all the BPF 71 to 74 of the detection filter portion 7, the center frequency f2 of the BPF 72 is selected as the optimal peak frequency f0. When the peak value of the signals extracted by the BPF 73 is the largest, the center frequency f3 is selected as the optimal peak frequency f0. Similarly, when the peak value of the signals extracted by the BPF 71 or 74 is the largest, the center frequency f1 or f4 is selected as the optimal peak frequency f0.

Figure 5A:
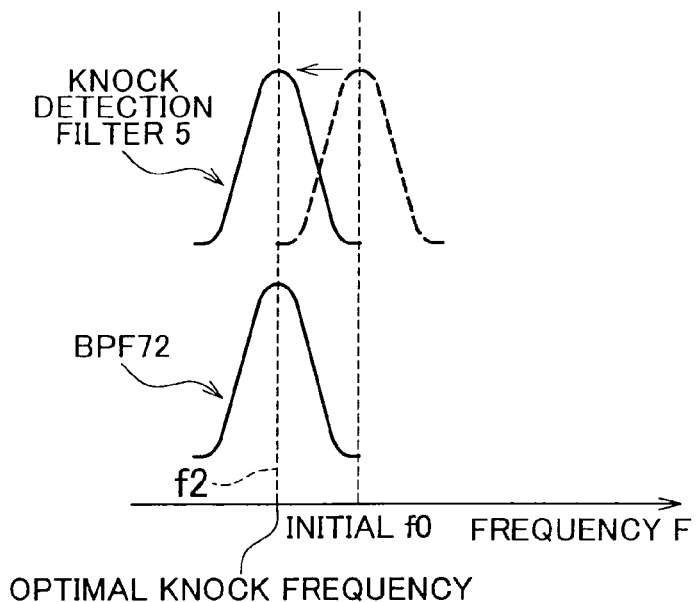
FIGS. 5A, 5B are views showing an example of the content of the optimal frequency setting process.
Figure 5B:
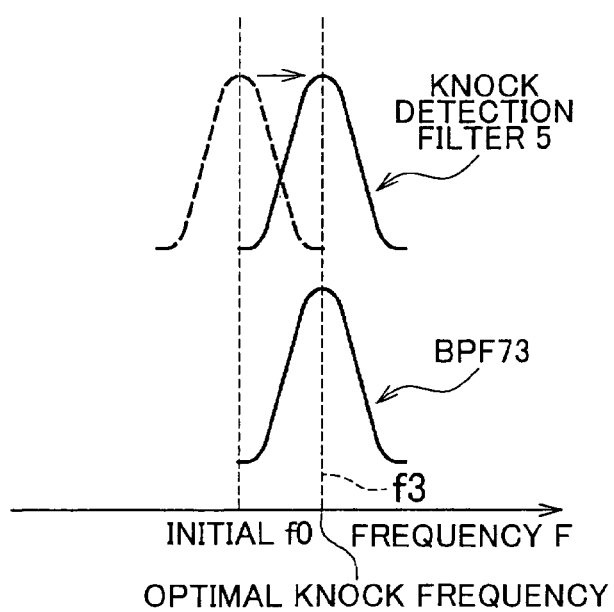
Figure 6:
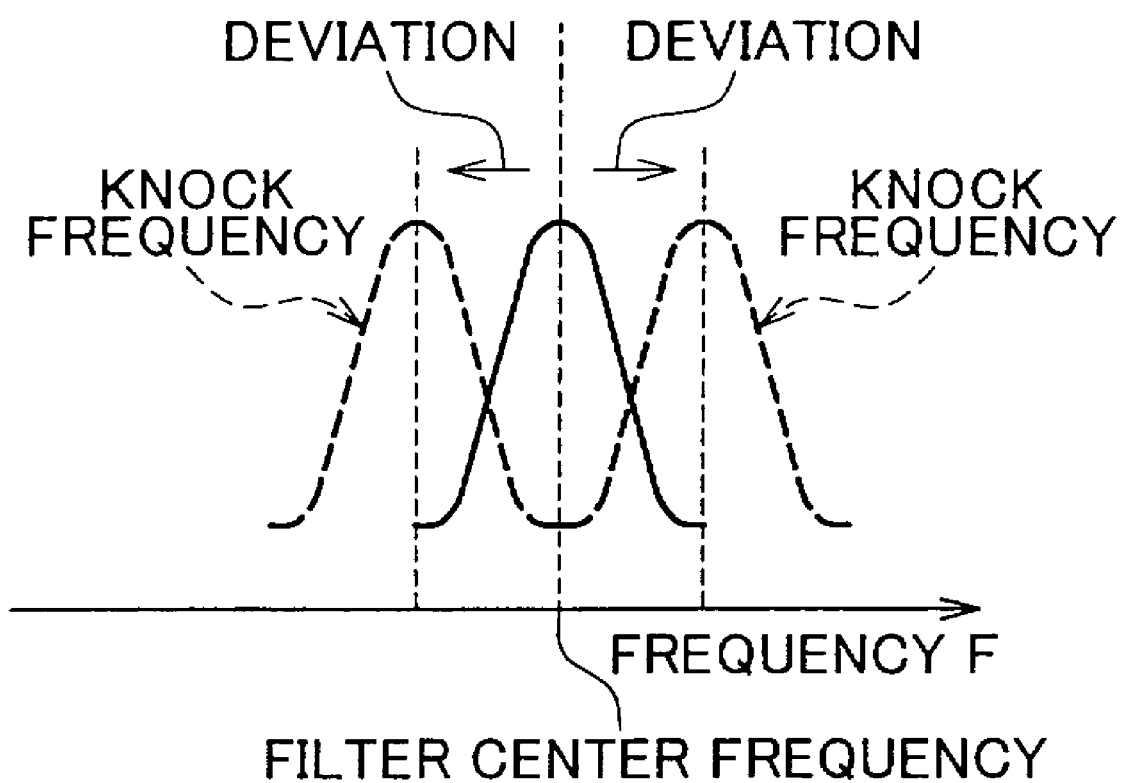

Next, in step ST3, the ECU 3 compares the center frequency that has been set to the knock detection filter 5, that is, the previous optimal peak frequency f0, with the presently optimal peak frequency f0 selected in step ST2. If the previous optimal peak frequency f0 is different from the presently optimal peak frequency f0, that is, if the determination result in step ST3 is YES, the ECU 3 switches the center frequency of the filtering frequency band of the knock detection filter 5 to the presently selected optimal peak frequency f0 in step ST4. More specifically, when the presently optimal peak frequency f0 selected in step ST2 is, for example, the center frequency f2 of the BPF 72, the ECU 3 switches the presently set center frequency of the filtering frequency band of the knock detection filter 5 to the center frequency f2 of the filtering frequency band of the BPF 72, as shown in FIG. 5A. When the presently selected optimal peak frequency f0 is the center frequency f3 of the BPF 73, the ECU 3 switches the presently set center frequency of the filtering frequency band of the knock detection filter 5 to the center frequency f3 of the BPF 73. Similarly, the ECU 3 switches the center frequency of the filtering frequency band of the knock detection filter 5 to the center frequency f1 of the BPF 71 or the center frequency f4 of the BPF 74 as needed. Note that the center frequency of the filtering frequency band of the knock detection filter 5 may be switched between two of the center frequencies f0 to f4 in various combinations. The process to change the center frequency of the filtering frequency band of the knock detection filter 5, as described above, is executed at predetermined intervals, for example, every minute.

When the determination result in step ST3 is NO, that is, there is no deviation between the previous optimal peak frequency f0 and the presently selected optimal peak frequency f0, the ECU 3 does not change the center frequency of the filtering frequency band of the knock detection filter 5, and temporarily terminates the present routine with the previous optimal peak frequency f0 being maintained. Note that, when a change in the knock frequency due to age deterioration of the engine 1 or other is small, the process to change the center frequency of the filtering frequency band of the knock detection filter 5 is not executed until the peak value of the signals extracted by the knock detection filter 5 falls below the peak value of the signals extracted by any one of the BPF 71 to 74, and the initial center frequency f0 that has been initially set is maintained.

According to the optimal knock frequency setting processing described above, the frequency with the highest accuracy in detecting knocks is selected based on the signals output from BPF 71-74 (the optimal frequency detection filters) having mutually different filtering frequencies, and the selected frequency, which is presently the optimal knock frequency, is then set to the knock detection filter 5. Therefore, when the knock frequency of the engine 1 changes due to age deterioration of the engine 1 or other, the center frequency of the filtering frequency band of the knock detection filter 5 is accordingly changed. Thus, desired accuracy in detectirig knocks can be maintained.

OTHER PREFERRED EMBODIMENT

In the example described above, four filters (BPFs) are used to determine the optimal knock frequency. However, the number of such filters is not limited to 4 but may alternatively be 2 or 3, or 5 or more.

In the example described above, whether knocks are occurring is determined by comparing the peak value of the output signals extracted by the knock detection filter 5 with the predetermined knock determination level. However, alternatively, whether knocks are occurring may be determined by comparing a value obtained by integrating the output signals of the knock detection filter 5 within a specific range or period with a predetermined knock determination level.

In the foregoing example, the center frequency of the filtering frequency band of the filter that provides the highest peak value of the output signals, among all the filters (BPFs) for detecting an optimal knock frequency, is determined as an optimal knock frequency, and the determined optimal knock frequency is then set to the knock detection filter. However, alternatively, the center frequency of the filtering frequency band of the filter that provides the largest integral value of the output signals, among all the filters (BPFs) for detecting the optimal frequency (BPF), may be determined as the optimal knock frequency and set to the knock detection filter.

What is claimed is:

1. A knock control apparatus for an internal combustion engine, comprising:

a knock sensor that detects a vibration of the internal combustion engine;

a knock detection filter that extracts signals that fall in a filtering frequency band from among signals output from the knock sensor;

a knock determination device that determines whether knocks are occurring based on the signals extracted by the knock detection filter, a result of the determination being used to control an operating state of the internal combustion engine;

a plurality of optimal knock frequency detection filters used to filter the signals output from the knock sensor and having mutually different filtering frequency bands; and an optimal knock frequency setting device that sets a center frequency of the filtering frequency band of the knock detection filter to an optimal knock frequency that is determined based on the signals extracted by the optimal knock frequency detection filters.

2. The knock control apparatus according to claim 1, wherein the optimal frequency setting apparatus selects a center frequency of a filtering frequency band of one of the optimal knock frequency detection filters that has detected a largest number of knocks for a predetermined period of time, and sets the selected center frequency to the knock detection filter as the optimal knock frequency.

3. The knock control apparatus according to claim 1, wherein the optimal knock frequency setting apparatus compares a center frequency of the filtering frequency band that has been set to the knock detection filter and a presently optimal knock frequency determined based on the signals extracted by the optimal knock frequency detection filters, and if the center frequency is different from the presently optimal knock frequency, sets the presently optimal knock frequency to the knock detection filter.

4. The knock control apparatus according to claim 1, wherein an initial center frequency of the filtering frequency band of the knock detection filter is one of 7 kHz, 11 kHz, and 14 kHz.

5. The knock control apparatus according to claim 1, wherein a center frequency of a filtering frequency band of one or more of the optimal knock frequency detection filters is set higher than an initial center frequency of the filtering frequency band of the knock detection filter by an order of magnitude, from 0.1 to 0.3 kHz, and a center frequency of a filtering frequency band of one or more of the optimal frequency detection filters is set lower than the initial center frequency of the filtering band of the knock detection filter by an order of magnitude, from 0.1 to 0.3 kHz.

6. The knock control apparatus according to claim 1, wherein the optimal frequency setting apparatus selects a center frequency of a filtering frequency band of one of the optimal knock frequency detection filters which provides a largest peak value of the extracted signals, and sets the selected center frequency to the knock detection filter as the optimal knock frequency.

7. The knock control apparatus according to claim 1, wherein the optimal frequency setting apparatus selects a center frequency of a filtering frequency band of one of the optimal knock frequency detection filters which provides a largest integral value of the extracted signals, and sets the selected center frequency to the knock detection filter as the optimal knock frequency.

8. A knock control method for an internal combustion engine including a knock sensor that detects a vibration of the internal combustion engine, a knock detection filter that extracts signals that fall in a filtering frequency band from among signals output from the knock sensor, and a knock determination device that determines whether knocks are occurring based on the signals extracted by the knock detection filter, the method comprising the steps of:

setting center frequency of the filtering frequency band of the knock detection filter to an optimal knock frequency that is determined based on signals extracted by a plurality of optimal knock frequency detection filters used to filter the signals output from the knock sensor and having mutually different filtering frequency bands; and controlling an operating state of the internal combustion engine based on a result of the determination by the knock determination device.

9. The knock control method for an internal combustion engine according to claim 8, wherein a center frequency of a filtering frequency band of one of the optimal knock frequency detection filters that has detected a largest number of knocks for a predetermined period of time is selected and set to the knock detection filter as the optimal knock frequency.

10. The knock control method for an internal combustion engine according to claim 8, wherein a comparison is made between a center frequency of the filtering frequency band that has been set to the knock detection filter and a presently optimal knock frequency determined based on the signals extracted by the optimal knock frequency detection filters, and if the center frequency is different from the presently optimal knock frequency, the presently optimal knock frequency is set to the knock detection filter.

11. The knock control method for an internal combustion engine according to claim 8, wherein an initial center frequency of the filtering frequency band of the knock detection filter is one of 7 kHz, 11 kHz, and 14 kHz.

12. The knock control method for an internal combustion engine according to claim 8, wherein a center frequency of a filtering frequency band of one or more of the optimal knock frequency detection filters is set higher than an initial center frequency of the filtering frequency band of the knock detection filter by an order of magnitude, from 0.1 to 0.3 kHz, and a center frequency of a filtering frequency band of one or more of the optimal frequency detection filters is set lower than the initial center frequency of the filtering band of the knock detection filter by an order of magnitude, from 0.1 to 0.3 kHz.

13. The knock control method for an internal combustion engine according to claim 8, wherein a center frequency of a filtering frequency band of one of the optimal knock frequency detection filters which provides a largest peak value of the extracted signals is selected and set to the knock detection filter as the optimal knock frequency.

14. The knock control method for an internal combustion engine according to claim 8, wherein a center frequency of a filtering frequency band of one of the optimal knock frequency detection filters which provides a largest integral value of the extracted signals is selected and set to the knock detection filter as the optimal knock frequency.

* * * * *